United States Patent [19]

Clatty

[11] Patent Number: 4,751,252

[45] Date of Patent: Jun. 14, 1988

[54] COMBUSTION MODIFIED ISOCYANATE USEFUL FOR RIM STRUCTURAL FOAMS

[75] Inventor: Jan L. R. Clatty, Monaca, Pa.

[73] Assignee: Mobay Corporation, Pittsburgh, Pa.

[21] Appl. No.: 50,792

[22] Filed: May 14, 1987

[51] Int. Cl.$^4$ .............................................. C08G 18/14
[52] U.S. Cl. ................................. 521/114; 252/182.7; 264/51; 521/906
[58] Field of Search .................. 521/114, 906; 264/51; 252/182

[56] References Cited

U.S. PATENT DOCUMENTS

| | | | |
|---|---|---|---|
| 3,385,867 | 5/1968 | Chang | 521/114 |
| 4,221,874 | 9/1980 | Moedritzer | 521/108 |
| 4,287,309 | 9/1981 | Cobbledick | 521/114 |
| 4,409,341 | 10/1983 | Hira | 521/162 |
| 4,433,071 | 2/1984 | Fesman | 521/114 |

*Primary Examiner*—Maurice J. Welsh
*Attorney, Agent, or Firm*—Gene Harsh; Joseph C. Gil; Lyndanne M. Whalen

[57] ABSTRACT

Polyisocyanate addition products, particularly polyurethane foams having improved flame resistance are obtained by reacting a combustion modified isocyanate with an isocyanate reactive component containing an isocyanate reactive material, a phosphorus containing combustion modifier and a blowing agent. The combustion modified isocyanate is made up of an organic polyisocyanate and a brominated diphenylether.

9 Claims, No Drawings

4,751,252

COMBUSTION MODIFIED ISOCYANATE USEFUL FOR RIM STRUCTURAL FOAMS

BACKGROUND OF THE INVENTION

The present invention relates to combustion modified isocyanate compositions useful for the production of polyurethanes for structural applications, particularly polyurethanes produced by a RIM process.

As polyurethanes increase in importance for construction applications, the importance of decreased flammability and smoke generation also increases.

Many attempts to improve the flammability characteristics of structural polyurethane foams have been made. In U.S. Pat. No. 4,221,874, for example, it is noted that many additives and modifiers have been used in an effort to decrease the rate of burning and flame spread. Most of these additives and modifiers are, however, organic materials which will also burn. The known inorganic flame retardants must generally be used in such large quantities that they have a detrimental effect upon the polymer's physical properties. U.S. Pat. No. 4,221,874 teaches that these difficulties may be overcome by including 5-50 wt. % of a brominated phospholane oxide in the organic polymer. The brominated phospholane oxide may be added to the already-formed polymer or it may be included in one of the components from which the polymer is formed.

U.S. Pat. No. 4,409,341 is also directed to improving the fire resistance of polyurethane foams. The improvement therein is said to be achieved by including 0.35–3.0 wt. % of a phosphorus compound that is liquid at room temperature in the polyol component of a polyurethane-forming system.

Brominated diphenylethers have also been incorporated in the polyol component of polyurethane forming systems in an effort to improve the flame resistance of the product polyurethane. However, the burn properties of foams produced from such polyol components are not maintained for any significant amount of time. (See Examples 19–22 infra)

SUMMARY OF THE INVENTION

It is an object of the present invention to provide a combustion modified isocyanate component useful in the production of polyisocyanate addition products, particularly in the production of structural polyurethanes by a RIM process.

It is a further object of the present invention to provide a combustion modified isocyanate component which is storage stable.

It is also an object of the present invention to provide a RIM process for the production of polyurethanes having improved flame resistance properties.

It is yet another object of the present invention to provide a polyurethane material having improved flame resistance which is useful in structural applications.

These and other objects which will be apparent to those skilled in the art are accomplished by combining an organic polyisocyanate with a brominated diphenyl ether to form a combustion modified polyisocyanate which is storage stable. This combustion modified polyisocyanate may then be reacted with an isocyanate-reactive component by, for example, a RIM process. The resultant polyisocyanate addition products are characterized by improved flame resistance.

DETAILED DESCRIPTION OF THE INVENTION

The present invention is directed to combustion modified polyisocyanates, to polyisocyanate addition products produced therefrom and to a process for making such polyisocyanate addition products.

The modified polyisocyanates of the present invention are combinations of an organic polyisocyanate and at least one brominated diphenyl ether.

The polyisocyanates useful in the present invention include essentially any organic polyisocyanate, including aliphatic, cycloaliphatic, araliphatic, aromatic and heterocyclic polyisocyanates, of the type described for example by W. Siefken in Justus Liebigs Annalen der Chemie, 562, pages 75 to 136. Specific examples of suitable polyisocyanates include: ethylene diisocyanate: 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and, mixtures of these isomers; 1-isocyanato-3,3,5-trimethyl-5-isocyanatomethylcyclohexane (German Auslegeschrift No. 1,202,785); 2,4- and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenylmethane-2,4'- and/or -4,4'-diisocyanate; naphthylene-1,5-diisocyanate; triphenylmethane-4,4',4''-triisocyanate; polyphenyl polymethylene polyisocyanates of the type obtained by condensing aniline with formaldehyde, followed by phosgenation, and described for example, in British Pat. Nos. 874,430 and 848,671: perchlorinated arylpolyisocyanates of the type described in German Auslegeschrift No. 1,157,601; polyisocyanates containing carbodiimide groups of the type described in German Pat. No. 1,092,007; diisocyanates of the type described in U.S. Pat. No. 3,942,330; polyisocyanates containing allophanate groups of the type described in British Pat. No. 994,890, Belgian Pat. No. 761,262 and published Dutch Patent Application No. 7,102,524; polyisocyanates containing isocyanurate groups of the type described in German Pat. Nos. 1,022,789, 1,222,067 and 1,027,394, and in German Offenlegungsschriften Nos. 1,929,034 and 2,004,048; polyisocyanates containing urethane groups of the type described in Belgian Pat. No. 752,261 and in U.S. Pat. No. 3,394,164; polyisocyanates containing acylated urea groups as described in German Pat. No. 1,230,778; polyisocyanates containing biuret groups of the type described in German Pat. No. 1,101,394, in British Pat. No. 889,050, and in French Pat. No. 7,017,514; polyisocyanates obtained by telomerization reactions of the type described in Belgian Pat. No. 723,640 polyisocyanates containing ester groups of the type described, in British Pat. Nos. 965,474 and 1,072,956, in U.S. Pat. No. 3,567,763 and in German Pat. No. 1,231,688; and, reaction products of the aforementioned isocyanates with acetals according to German Pat. No. 1,072,385.

It is also possible to use distillation residues containing isocyanate groups of the type which accumulate in the commercial production of isocyanates, optionally in solution in one or more of the aforementioned polyisocyanates. It is also possible to use mixtures of the aforementioned polyisocyanates.

As a rule, it is preferred to use readily available polyisocyanates such as 2,4- and 2,6-tolylene diisocyanate and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

Examples of particularly preferred polyisocyanates include 4,4'-diphenylmethane diisocyanate liquefied by partial carbodiimide formation, and "liquefied" 4,4'-diphenylmethane diisocyanate obtainable by reacting 1 mol of 4,4'-diphenylmethane diisocyanate with approximately 0.1 to 0.3 mols of dipropylene glycol or polypropylene glycol with a maximum molecular weight of 700.

Any brominated diphenyl ether is useful in the production of the combustion modified polyisocyanates of the present invention. Specific examples of suitable brominated diphenylether combustion modifiers include: tetrabromodiphenylether, pentabromodiphenylether, hexabromodiphenylether, higher brominated diphenylethers such as decabromodiphenylether, lower brominated diphenylethers and mixtures thereof. Such brominated diphenylethers are commercially available under the names Saytex 115 flame retardant (Ethyl Corporation), Saytex 125 flame retardant (Ethyl Corporation), Great Lakes DE 60F flame retardant (Great Lakes Chemical Corp.) and Great Lakes DE71 flame retardant (Great Lakes Chemical Corp.).

The combustion modified polyisocyanates of the present invention may also include any of the known additives included in a polyisocyanate component of a system for producing polyisocyanate addition products such as polyurethanes, particularly systems for RIM processes. Examples of such additives are polyols to make prepolymers, internal mold release agents, surfactants and other combustion modifiers. However, such additives are not necessary.

The combustion modified polyisocyanates of the present invention may be produced by simply mixing the polyisocyanate with the brominated diphenylether at room temperature and agitating the mixture until it is homogeneous. Such homogeneous mixtures are storage stable for relatively long periods of time (i.e. for at least as long as 1 year).

The polyisocyanate and brominated diphenylether are generally used in an amount such that at least 15 parts by weight, preferably from 10 to 20 parts by weight of brominated diphenyl ether are present for every 100 parts by weight of polyisocyanate.

The combustion modified polyisocyanate of the present invention may be used to produce polyisocyanate addition products by reacting it with a suitable isocyanate reactive material optionally in the presence of conventional additives such as blowing agents, catalysts, surface active additives, etc. Suitable isocyanate-reactive materials include compounds with at least two isocyanate-reactive hydrogen atoms and a molecular weight of from 62 to 10,000. Such compounds include those containing amino groups, thiol groups, hydroxyl groups and/or carboxyl groups. The preferred compounds are the polyhydroxyl compounds, especially polyhydroxyl compounds containing from 2 to 8 hydroxyl groups, and particularly those with molecular weights of from 200 to 10,000 (preferably from 1000 to 6000). Examples of such preferred compounds include polyesters, polyethers, polythioethers, polyacetals, polycarbonates, and polyester amides containing at least 2, generally from 2 to 8 and more preferably from 2 to 4 hydroxyl groups, of the type known to be useful for the production of homogeneous and cellular polyurethanes.

In the process of the present invention, the aforementioned relatively high molecular weight polyhydroxyl compounds are often used in admixture with up to 95 weight %, preferably with up to 50 weight %, based on the total quantity of polyhydroxyl compounds, of low molecular weight polyols with molecular weights of from 62 to 200. Low molecular weight polyols of this type include glycols, 1,2-propane diol, 1,3-propane diol, 1,2-butane diol, 1,6-hexane diol, 1,10-decane diol, diethylene glycol, triethylene glycol, tetraethylene glycol, dipropylene glycol, tripropylene glycol, glycerol, trimethylol-propane and the like. Glycerine based low molecular weight polyols are particularly preferred.

Hydroxyl-group-containing polyesters useful in the production of polyurethanes include reaction products of polyhydric, preferably dihydric and, optionally, also trihydric alcohols with polyvalent, and preferably divalent, carboxylic acids. Instead of using the free polycarboxylic acids, it is also possible to use the corresponding polycarboxylic acid anhydrides or corresponding polycarboxylic acid esters of lower alcohols or mixtures thereof for producing such polyesters. The polycarboxylic acids may be aliphatic, cycloaliphatic, aromatic and/or heterocyclic and may optionally be substituted (e.g., by halogen atoms) and/or unsaturated. Examples of such polycarboxylic acids, anhydrides and esters include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include: ethylene glycol, 1,2-propylene glycol and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylolpropane, 1,2,6-hexane triol, 1,2,4-butane dioltrimethylolethane, pentaerythritol, quinitol, mannitol and sorbitol, methyl glycolside, also diethylene glycol, triethylene glycol, tetraethylene glycol, polyethylene glycol, dipropylene glycol, polypropylene glycols, dibutylene glycol and polybutylene glycols. The polyesters may also contain some terminal carboxyl groups. Polyesters of lactones, for example ε-caprolactone, or hydroxycarboxylic acids, for example ω-hydroxy caproic acid, may also be used.

The polyethers containing at least 2, generally 2 to 8, preferably 2 to 3, hydroxyl groups suitable for the production of polyurethanes in accordance with the invention are also known. Such polyethers may be obtained, for example, by polymerizing epoxides, such as ethylene oxide, propylene oxide, butylene oxide, tetrahydrofuran, styrene oxide or epichlorohydrin in the presence of $BF_3$, or by chemically adding these epoxides, optionally in admixture or successively to components containing reactive hydrogen atoms, such as water, alcohols or amines. Examples of components containing reactive hydrogen atoms include: water, ethylene glycol, 1,3- propylene glycol, 1,2-propylene glycol, trimethylolpropane, 4,4'-dihydroxy diphenylpropane, aniline, ammonia, ethanolamine and ethylene diamine. Sucrose polyethers of the type described in German Auslegeschriften Nos. 1,176,358 and 1,064,938 may also be used. In many cases, it is preferred to use polyethers of the type which contain substantial amounts of primary OH-groups (up to 90 weight % based on all of the OH-groups present in the polyether). Polyethers modified by vinyl polymers, of the type formed, for example, by polymerizing styrene, acrylonitrile in the presence of polyethers (U.S. Pat. Nos. 3,383,351, 3,304,273, 3,352,093 and 3,110,695, and German Pat. No. 1,152,536), are also suitable, as are polybutadienes containing OH-groups.

Among the polythio ethers, the condensation products of thiodiglycol with itself and/or with other glycols, dicarboxylic acids, formaldehyde, aminocarboxylic acids or amino alcohols are particularly useful. The products are polythio mixed ethers, polythio ether esters or polythio ether ester amides, depending upon the co-components.

Examples of suitable polyacetals include: the compounds obtainable from glycols, such as diethylene glycol, triethylene glycol, 4,4'-dioxethoxy diphenyl dimethylmethane, hexane diol, and formaldehyde. Polyacetals suitable for use in accordance with the invention may also be obtained by polymerizing cyclic acetals.

Suitable polycarbonates containing hydroxyl groups are known and may be obtained, for example, by reacting diols such as 1,3-propane diol, 1,4-butane diol, 1,6-hexane diol, diethylene glycol, triethylene glycol and/or tetraethylene glycol with diaryl carbonates (e.g. diphenyl carbonate) or phosgene.

The suitable polyester amides and polyamides include: the predominantly linear condensates obtained from polyvalent saturated and unsaturated carboxylic acids or their anhydrides and polyhydric, saturated and unsaturated amino alcohols, diamines, polyamines and mixtures thereof.

Polyhydroxyl compounds already containing urethane or urea groups and optionally modified natural polyols such as castor oil, carbohydrates and starch may also be used. Addition products of alkylene oxides with phenolformaldehyde resins or even with ureaformaldehyde resins may also be used in accordance with the invention.

Representatives of the many and varied compounds usable in accordance with the invention may be found, for example, in High Polymers, Vol. XVI "Polyurethanes, Chemistry and Technology", by Saunders-Frisch, Interscience Publishers, New York, London, Vol. I, 1964, pages 5 to 6 and 198 to 199; and, in Kunststoff-Handbuch, Vol. VII, Vieweg-Hochtlen, Carl-Hanser-Verlag, Munich, 1966, pages 45 to 71.

In the production of polyisocyanate addition products in accordance with the present invention, the reactants (including the water optionally used as blowing agent) are used in quantitative ratios such that an NCO-Index of from 70 to 160 is maintained. (An NCO-Index of 100 signifies the presence of equivalent quantities of isocyanate groups and active hydrogen atoms reacting with those isocyanate groups in the reaction mixture.) In the production of the structural foams which are of particular interest in the present invention, the NCO-Index is generally between 90 and 110.

Water and/or readily volatile organic substances may be used as blowing agents in the production of polyisocyanate addition products in accordance with the present invention. Examples of organic blowing-agents include: acetone; ethylacetate; methanol; ethanol; halogen-substituted alkanes such as methylene chloride, chloroform, ethylidene chloride, vinylidene chloride, monofluorotrichloromethane, chlorodifluoromethane, and dichlorodifluoromethane, -butane, -hexane, -heptane, diethylether and the like. A blowing effect may also be obtained by adding compounds which decompose at temperatures above room temperature to give off a gas (for example, nitrogen). Such compounds include azo compounds (e.g. azoisobutyronitrile). Other examples of blowing agents and details of their use may be found in Kunststoff-Handbuch, Vol. VII, Vieweg and Hochtlen, Carl-Hanser-Verlag, Munich, 1966, pages 108 and 109, 435 to 455 and 507 to 510.

Catalysts are often used in the production of polyisocyanate addition products by processes such as that of the present invention. Suitable catalysts include tertiary amines, such as triethylamine, tributylamine, N-methylmorpholine, N-ethyl morpholine, N-cocomorpholine, N,N,N',N'-tetramethylethylene diamine, 1,4-diazabicylo-(2, 2, 2)octane, N-methyl-N'-N,N-dimethylaminoethyl piperazine, N,N-dimethylbenzylamine, bis-(N,N-diethylaminoethyl)-adipate, N,N-diethylbenzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethylimidazole and 2-methylimidazole.

Tertiary amines containing isocyanate-reactive hydrogen atoms may also be used. Such tertiary amines include: triethanolamine, triisopropanolamine, N-methyl diethanolamine, N-ethyl diethanolamine, N,N-dimethylethanolamine, and their reaction products with alkylene oxides such as propylene oxide and/or ethylene oxide.

Other suitable catalysts include silaamines with carbon-silicon bonds of the type described in German Pat. No. 1,229,290, such as 2,2,4-trimethyl-2-silamorpholine and 1,3-diethylamino methyl tetramethyl disiloxane.

Other suitable catalysts include nitrogen-containing bases such as tetraalkyl ammonium hydroxides; alkali hydroxides, such as sodium hydroxide; alkali phenolates, such as sodium phenolate; and alkali alcoholates, such as sodium methylate. Hexahydrotriazines may also be used as catalysts. Organometallic compounds such as organo tin compounds, may also be used as catalysts. Preferred organo tin compounds are tin(II) salts of carboxylic acids, such as tin(II)acetate, tin(II)octoate, tin(II)ethyl hexoate and tin(II)laurate, and the dialkyl tin salts of carboxylic acids, such as dibutyl tin diacetate, dibutyl tin dilaurate, dibutyl tin maleate and dioctyl tin diacetate.

Further representatives of catalysts suitable for use in accordance with the invention, and particulars of the way in which the catalysts work, may be found in Kunststoff-Handbuch, Vol. VII, Vieweg and Hochtlen, Carl-Hanser-Verlag, Munich, 1966, pages 96 to 102.

If a catalyst is employed, it is used in a quantity from about 0.001 to 10 weight %, based on the total quantity of compounds with at least two isocyanate-reactive hydrogen atoms and molecular weights of from 62 to 10,000.

Theoretically it may be possible to obtain a good flame retardant polyisocyanate addition product without using any known flame proofing agent other than the brominated diphenylether present in the combustion modified polyisocyanate of the present invention by using substantial amounts of the brominated diphenylether. However, in practice it has been found that products with good flame resistance properties are obtained when a minor amount (e.g. from 3 to 4 wt. % based on 100 pbw isocyanate-reactive materials) of a second known combustion modifier preferably a phosphate, polyphosphate or phosphorus-based material (e.g. Antiblaze 19 flame retardant sold by Albright & Wilson) is included in one of the reaction components.

This additional known combustion modifier (flame retardant) may be incorporated directly into the reaction mixture, in the combustion modified polyisocyanate of the present invention or in the component containing polyisocyanate-reactive materials. It is preferred however that such additional flame proofing agent be included in with the polyisocyanate reactive materials. This additional flame proofing agent may generally be used in substantially lower quantities than in prior art systems and is preferably used in a quantity of from 2 to 10 wt. %, more preferably 2 to 4 wt. % of the total of isocyanate-reactive compounds.

Surface-active additives such as emulsifiers and foam stabilizers may also be used in the production of isocyanate addition products in accordance with the present invention. Examples of suitable emulsifiers include the sodium salts of castor oil sulphonates; the sodium salts of fatty acids; and the salts of fatty acids with amines such as oleic acid/diethylamine and stearic acid/diethanolamine. Alkali or ammonium salts of sulphonic acids such as dodecyl benzene sulphonic acid and dinaphthylmethane disulphonic acid; of fatty acids, such as ricinoleic acid; or of polymeric fatty acids, may also be used as surface-active additives.

Suitable foam stabilizers include water-soluble polyether siloxanes. These compounds are generally synthesized in such a way that a copolymer of ethylene oxide and propylene oxide is attached to a polydimethyl siloxane radical. Foam stabilizers of this type are described in U.S. Pat. No. 3,201,372.

In accordance with the present invention, it is also possible to use reaction retarders such as acid-reacting substances (e.g. hydrochloric acid or organic acid halides); cell regulators such as paraffins or fatty alcohols or dimethyl polysiloxanes; pigments; dyes; stabilizers against aging and weathering; plasticizers; fungistatic and bacteriostatic agents; and fillers, such as barium sulphate, kieselguhr, carbon black or whiting.

Other examples of the many and varied additives which may be used in the production of polyisocyanate addition products in accordance with the present invention, together with particulars on the way in which these additives are used and the manner in which they work, may be found in Kunststoff-Handbuch, Vol. VI, Vieweg and Hochtlen, Carl-Hanser-Verlag, Munich, 1966, for example on pages 103 to 113.

Foams, particularly polyurethane foams, may be produced in accordance with the present invention by mixing the combustion modified polyisocyanate of the present invention with an isocyanate reactive component, optionally containing catalyst and other additives and then injecting the resulting mixture into a closed metallic mold or an open mold (the conventional method). The reaction components may also be subjected to impingement mixing at 8 to 20 mPa in a reaction injection molding machine and the resulting mixture injected into a metallic mold (RIM).

As the reaction injection mold machine, there may be used those which have already been put on the market by Toho Machinery Co., Ltd. (Japan), Cincinnati Millacron Inc. (USA), Battenfeld Machinenfabriken GmbH (West Germany), Elastogran Maschinenbau (West Germany), Maschinenfabrik Hennecke GmbH (West Germany), Krauss-Maffei A.G. (West Germany), etc.

As the mold, there may be used metallic molds made of aluminum, iron or the like, resin molds made of silicone rubber, epoxy resin or the like, and wooden molds. Foams having no skin layer can also be produced by foaming the composition in an open mold.

According to the invention, foaming is carried out in molds. To this end, the reaction mixture is introduced into a mold made of a metal such as aluminum, or of a plastic material such as an epoxide resin. The foamable reaction mixture foams inside the mold and forms the molding. In-mold foaming may be carried out in such a way that the molding has a cellular structure at its surface or in such a way that the molding has a compact skin and a cellular core. It is possible to introduce into the mold such a quantity of foamable reaction mixture that the foam formed just fills the mold. However, it is also possible to introduce into the mold more foamable reaction mixture than is required to fill the interior of the mold with foam. This particular technique is known as "overcharging" and is described, for example, in U.S. Pat. Nos. 3,178,490 and 3,182,104.

It is also possible to produce cold-hardening foams (see e.g. British Pat. No. 1,162,517 and German Offenlegungsschrift No. 153,086).

Known release agents may be used for in mold foaming. Examples of such release agents include: salts of saturated or unsaturated aliphatic or cycloaliphatic carboxylic acids with at least 8 carbon atoms and salts of tertiary amines of the type in which the atom ratio of tertiary amine nitrogen to carbon in the molecule is between 1:3 and 1:12, preferably between 1:3 and 1:9.

The release agents may be used in quantities of from 0.1 to 15 weight %, preferably in quantities of from 0.3 to 9 weight %, based on the reaction mixture as a whole.

Other release agents or release agent systems for example those of the type described in U.S. Pat. No. 3,726,952, German Offenlegungsschrift No. 2,121,670 and Belgian Pat. No. 782,942 may, of course, also be used. These release agents include the oleic acid or tall oil fatty acid salt of the amide-group-containing amine obtainable by reacting N-dimethylamino propylamine with oleic acid or tall oil fatty acid.

It is also possible to use release agents of the type which are introduced into the foam by means of modified isocyanates and which are described, for example in U.S. Pat. No. 4,033,912.

In the present invention, the reaction components may be reacted by the known one-shot process, by the prepolymer process or by the semi-prepolymer process, in many cases using machines such as those of the type described in U.S. Pat. No. 2,764,565. Particulars of processing machines which may also be used in accordance with the invention may be found in Kunststoff-Handbuch, Vol. VI, Vieweg and Hochtlen, Carl-Hanser-Verlag, Munich, 1966, for example on pages 121 to 205.

Having thus described my invention, the following examples are given as being illustrative thereof. All parts and percentages given in these examples are parts by weight and percentages by weight, unless otherwise indicated.

EXAMPLES

The following materials were used in the examples more fully described below.

Polyisocyanate A: Polymeric MDI isocyanate having a 31.5% NCO content.
Polyisocyanate B: A prepolymer of MDI and tripropylene glycol with a 22.3% NCO content
Polyisocyanate C: A 50/50 blend (weight basis) of Polyisocyanate A and Polyisocyanate B
Polyisocyanate D: A carbodiimide modified MDI having a 29.4% NCO content.
Polyisocyanate E: Polymeric MDI having a 32.8% NCO content.
Polyisocyanate F: Polymeric MDI having a 22% NCO content.
Flame Retardant A: The pentabromodiphenylether flame retardant available from Ethyl Corporation under the name Saytex 125 Flame Retardant.
Flame Retardant B: The pentabromodiphenylether also containing tetra-, hexa- and higher brominated diphenylethers available from Ethyl Corporation under the name Saytex 115 Flame Retardant.
Flame Retardant C: The pentabromodiphenylether also containing tetra- and hexa-bromo-diphenylethers available from Great Lakes Chemical Corp. under the name Great Lakes DE-71 Flame Retardant.
Flame Retardant D: The pentabromodiphenylether containing an aromatic phosphate available from Great Lakes Chemical Corp. under the name Great Lakes DE 60F.
Flame Retardant E: The pentabromodiphenylether containing an aromatic phosphate available from Great Lakes Chemical Corp. under the name Great Lakes DE 60F Special.
Flame Retardant F: A pentabromoethylbenzene (79% bromine) available from Ethyl Corp. under the name Saytex 105 Flame Retardant (Comparative).
Flame Retardant G: A phosphonate ester from Albright & Wilson sold under the designation AB 19.
Polyol A: A glycerine initiated propylene oxide polyether having a molecular weight of 159 and a hydroxyl number of 1058.
Polyol B: A glycerine initiated poly(oxyalkylene)-polyether having a hydroxyl number of 28, molecular weight of 6000 and containing 83% propylene oxide and 17% ethylene oxide.
Polyol C: A glycerine initiated propylene oxide polyether having a molecular weight of 358 and a hydroxyl number of 470.
Emulsifier: A quaternary ammonium salt of the amide of tall oil and N,N'-dimethyl 1,3-diamino propane.
Surfactant: A silicone copolymer available from Dow Corning under the designation DC-193.
Amine Catalyst: N,N'-dimethyl cyclohexyl amine.
Tin Catalyst: dibutyl tin dilaurate.
Blowing Agent: trichlorofluoromethane.

EXAMPLES 1–7

Combustion modified polyisocyanates were prepared by mixing the materials in the amounts given in Table 1. Each of the combustion modified polyisocyanates within the scope of the claimed invention (i.e. Examples 1–6) were storage stable at room temperature for over 1 year and did not exhibit any change in viscosity during the first week of storage. The comparative Flame Retardant F would not even dissolve in Polyisocyanate C. Consequently, the polyisocyanate composition of Example 7 could not be considered storage stable for any period of time.

TABLE 1

| Example No. | 1 | 2 | 3 | 4 | 5 | 6 | 7 |
|---|---|---|---|---|---|---|---|
| Polyisocyanate A (pbw) | — | — | 100 | — | — | — | — |
| Polyisocyanate B (pbw) | — | — | — | 100 | — | — | — |
| Polyisocyanate C (pbw) | 100 | — | — | — | — | — | 100 |
| Polyisocyanate D (pbw) | — | 100 | — | — | — | — | — |
| Polyisocyanate E (pbw) | — | — | — | — | 100 | — | — |
| Polyisocyanate F (pbw) | — | — | — | — | — | 100 | — |
| Flame Retardant A (pbw) | 15 | 15 | 15 | 15 | 15 | 15 | — |
| Flame Retardant F (pbw) | — | — | — | — | — | — | 15 |
| Change in viscosity after | | | | | | | |
| 1 Week | None | None | None | None | None | None | None |
| After 1 year | — | None | None | None | — | — | — |
| Storage Stability | Stable | Stable | Stable | Stable | Stable | Stable | Unstable |

EXAMPLE 8–10

Combination modified polyisocyanates were prepared from 100 parts by weight Polyisocyanate C using different flame retardant materials in the amounts given in Table 2. The viscosity and % NCO content of these materials at specified intervals are also given in Table 2.

TABLE 2

| Example # | 8 | 9 | 10 |
|---|---|---|---|
| Flame Retardant A (pbw) | — | — | 15 |
| Flame Retardant B (pbw) | — | 15 | — |
| Flame Retardant D (pbw) | 15 | — | — |
| Viscosity cps (centipoise) | | | |
| at room temperature | | | |
| initial | 392 | 474 | 395 |
| After 1 mo. | 403 | 480 | 395 |
| After 2 mos. | 441 | 522 | 464 |
| After 3 mos. | 442 | 533 | 442 |
| After 1 year | 522 | 520 | 496 |
| at 90° C. | | | |
| After 1 mo. | 405 | 464 | 403 |
| After 2 mos. | 441 | 518 | 471 |
| After 3 mos. | 446 | 529 | 449 |
| NCO Content (%) | | | |
| Room Temp. | | | |
| Initial | 23.8 | 23.8 | 23.8 |
| After 1 mo. | 23.6 | 23.6 | 23.6 |
| After 2 mos. | 23.6 | 23.5 | 23.7 |
| After 3 mos. | 23.6 | 23.6 | 23.6 |
| After 1 year | 23.5 | 23.6 | 23.5 |
| Stored at 90° C. | | | |
| After 1 mo. | 23.6 | 23.6 | 23.6 |
| After 2 mos. | 23.6 | 23.6 | 23.6 |
| After 3 mos. | 23.6 | 23.5 | 23.6 |

EXAMPLES 11-12

In laboratory evaluations, polyurethane foams were prepared by reacting the following combustion modified polyisocyanate and polyisocyanate reactive components in a ½" mold.

|  | 11 | 12 |
|---|---|---|
| Combustion Modified Polyisocyanate |  |  |
| Polyisocyanate C (gm) | 100 | 100 |
| Flame Retardant C (gm) | 15 | 15 |
| Polyisocyanate Reactive Component |  |  |
| Polyol A (gm) | 55 | 55 |
| Polyol B (gm) | 45 | 45 |
| Emulsifier (gm) | 6 | 6 |
| Surfactant (gm) | 3 | 3 |
| Amine Catalyst (gm) | 1.3 | 1.3 |
| Tin Catalyst (gm) | 0.2 | 0.2 |
| Blowing Agent (gm) | 10.0 | 10.0 |
| Flame Retardant G (gm) | — | 6.34 |
| Mix Ratio (isocyanate/polyol) (pbw) | 173/100 | 165/100 |

The resultant foams (½ inch panels) had the following burn properties:

|  | 11 | 12 |
|---|---|---|
| UL 94 Rating | Failed | V-0 |
| Total Burn Time (Sec) | 223 | 37 |

EXAMPLES 13-14

In laboratory evaluations, polyurethane foams were produced by reacting the combustion modified polyisocyanate and polyisocyanate reactive components described below. Also listed are the burn properties of these foams (½ inch panels).

|  | Ex. 13 | Ex. 14 |
|---|---|---|
| Combustion Modified Polyisocyanate |  |  |
| Polyisocyanate C (gm) | 100 | 100 |
| Flame Retardant D (gm) | 15 | 15 |
| Polyisocyanate Reactive Component |  |  |
| Polyol A (gm) | 55 | 55 |
| Polyol B (gm) | 45 | 45 |
| Emulsifier (gm) | 6 | 6 |
| Surfactant (gm) | 3 | 3 |
| Amine Catalyst (gm) | 1.3 | 1.3 |
| Tin Catalyst (gm) | 0.2 | 0.2 |
| Blowing Agent (gm) | 10 | 10 |
| Flame Retardant G (gm) | — | 6.34 |
| Mix Ratio (isocyanate/polyol) (pbw) | 173/100 | 165/100 |
| UL-94 Rating | failed | V-0 |
| Total Burn Time (Sec) | 235 | 41 |

EXAMPLE 15

A foam was produced on an HK-75 RIM machine from a combustion modified polyisocyanate component composed of 100 pbw Polyisocyanate C and 15 pbw Flame Retardant B and an isocyanate-reactive component. The isocyanate-reactive component was made up of 55 pbw Polyol A, 45 pbw Polyol B, 6 pbw Emulsifier, 3 pbw Surfactant, 1.3 pbw Amine Catalyst, 0.2 pbw Tin Catalyst, 10 pbw Blowing Agent and 6 pbw Flame Retardant G. These components were used in quantities such that the NCO Index was 110 and the mix ratio was 165/100. The physical properties of this foam were determined and half inch thick and quarter inch thick bars were tested for their UL 94 values initially and after two weeks of aging at 70° C. The results were as follows:

| Example 15 |  |  |
|---|---|---|
| Thickness (in) | .5 | .25 |
| Density (lbs/ft³) | 35.5 | 35.9 |
| Charpy (ASTM D 256-73) (ft-lb/sq in) | 8.87 | 9.68 |
| Heat Distortion Temp (°C. @ 60 psi load) | 83.2 | 57.2 |
| Initial flex modulus (psi) | 101,000 | 113,000 |
| Ultimate strength (psi) | 4632 | 3989 |
| UL-94 Rating | V-0 | V-0 |
| Total Burn Time (Sec) | 38 | 24 |
| UL-94 Rating @ 2 Weeks | V-0 | V-0 |
| Total Burn Time (Sec) | (49) | (38) |

EXAMPLE 16

Example 15 was repeated using the same polyisocyanate recative component but with a combustion modified polyisocyanate component made of 100 pbw Polyisocyanate C and 15 pbw Flame Retardant A. The results were as follows:

| Example 16 |  |  |
|---|---|---|
| Thickness (in) | .5 | .25 |
| Density (lbs/ft³) | 34.9 | 36.6 |
| Charpy (ASTM D-256-73) (ft-lb/sq in) | 6.78 | 7.54 |
| Heat Distortion Temp. (°C. @ psi load) | 70.6 | 60.5 |
| Initial Flex Modulus (psi) | 94,000 | 115,000 |
| Ultimate Strength (psi) | 4,318 | 4,205 |
| UL-94 Rating | V-0 | V-0 |
| Total Burn Time (Sec) | 42 | 30 |
| UL-94 Rating @ 2 Weeks | V-0 | V-0 |
| Total Burn Time (Sec) | 45 | 36 |

EXAMPLE 17

The procedure of Example 15 was repeated using the same polyisocyanate reactive component but with a combustion modified polyisocyanate made of 100 pbw Polyisocyanate C and 15 pbw Flame Retardant D. The results were as follows:

| Example 17 |  |  |
|---|---|---|
| Thickness (in) | .5 | .25 |
| Density (lbs/ft³) | 36.6 | 37.0 |
| Charpy (ASTM D-256-73) (ft-lb/sq in) | 7.37 | 7.34 |
| Heat Distortion Temp. (°C. @ 60 psi load) | 85.5 | 67.3 |
| Initial Flex Modulus (psi) | 96,300 | 113,000 |
| Ultimate Strength (psi) | 4,333 | 3,878 |
| UL-94 Rating | V-0 | V-0 |
| Total Burn Time (Sec) | 35 | 32 |
| UL-94 Rating @ 2 Weeks | V-0 | V-0 |
| Total Burn Time (Sec) | 50 | 29 |

EXAMPLE 18

A polyurethane foam was made by reacting a combustion modified polyisocyanate made from 100 parts by weight of a polyisocyanate prepolymer and 16 parts by weight Flame Retardant D with a polyisocyanate reactive component. The polyisocyanate prepolymer had an isocyanate content of 32.6 percent and was a reaction product of polymeric MDI with a hydroxyl group containing material based on adipic acid, pentaerythritol and oleic acid which hydroxyl material had an OH number of 50 and a molecular weight of approximately 2000. The polyisocyanate reactive component was made from 25 parts by weight of Polyol C, 25 parts by weight of Polyol A, 10 parts by weight ethylene diamine and 5 parts by weight propylene oxide (OH number 630, molecular weight 356), 25 parts by weight of glycerine initiated polyether containing 83% propylene oxide and 17% ethylene oxide (molecular weight 4800 and OH number 35), 5 parts by weight diethyltoluylenediamine, 6 parts by weight emulsifier, 1 part by weight triethylenediamine in dipropylene glycol, 0.105 parts by weight tin catalyst, 3 parts by weight surfactant, 5 parts by weight Flame Retardant A and 4 parts by weight blowing agent by a RIM process at a mix ratio of 140 parts polyisocyanate to 100 parts polyisocyanate reactive components. The properties of the foam were as follows:

| | |
|---|---|
| Density (lbs/ft$^3$) | 56.0 |
| Charpy (ASTM D 256-73) (ft-lb/sq in) | 11.57 |
| Heat Distortion Temp. (°C. @ 66 psi load) | 77.5 |
| Flex Modulus (psi) | 194,795 |
| Ultimate Strength (psi) | 7,496 |
| UL-94 Rating | V-0 |
| Total Burn Time (Sec) | 33 |

EXAMPLE 19–22 (COMPARATIVE)

Foams were made by reacting Polyisocyanate C with the polyisocyanate reactive mixture corresponding to that described in Example 15 with the exception that 7.4 wt. % Flame Retardant G (Example 19), 15 wt. % Flame Retardant C (Example 20) and 15 wt. % Flame Retardant C plus 5 wt. % Flame Retardant G (Example 21), and 20 wt. % Flame Retardant C (Example 22) were included in the polyisocyanate reactive component (rather than the polyisocyanate component). The foam of Example 19 had a UL Flammability rating of V-0. The foam of Example 20 failed, the foam of Example 21 had a rating of V-1 and the foam of Example 22 failed the UL-94 Flammability Test. The properties of these polyurethanes are shown in Table 3.

TABLE 3

| | Example No. | | | |
|---|---|---|---|---|
| Combustion Modified Polyisocyanate | 19 | 20 | 21 | 22 |
| Polyisocyanate C (grams) | 100 | 100 | 100 | 100 |
| Flame Retardant C (grams) | — | 21.3 | 22.6 | 30.1 |
| Flame Retardant G (grams) | 17 | — | 7.5 | — |
| NCO Index | 110 | 110 | 110 | 110 |
| Mix Ratio (Iso/Polyol Component) (pbw) | 132/100 | 128/100 | 121/100 | 121/100 |
| Cream Time (sec) | 6 | 13 | 11 | 9 |
| Gel Time (sec) | 19 | 19 | 21 | 20 |
| Tack Time (sec) | 23 | 21 | 22 | 22 |
| Density (lb/ft$^3$) | 38 | 34 | 33 | 33 |
| UL-94 Rating | V-0 | Fail | V-1 | Fail |
| Total Burn Time (UL-94 sec) | 25 | 151 | 110 | 159 |
| Heat Distortion Temp (°C. @ psi load) | 83.3 | 59.3 | 59.1 | 70.5 |
| Charpy (Impact Test-ASTM D-256-73) (ft/lb/sq in) | 11.6 | 5.1 | 7.31 | 5.7 |
| Initial Flex Modulus (psi) | 142,000 | 100,000 | 127,000 | 104,000 |
| Ultimate Strength (psi) | 6,000 | 3,878 | 5,018 | 4,097 |

EXAMPLES 23-24

A polyurethane foam was made by reacting a combustion modified polyisocyanate made from 100 pbw Polyisocyanate A and 15 pbw Flame Retardant A with a polyisocyanate reactive component made from 15 pbw Polyol A, 40 pbw of a sucrose based propylene oxide polyether having an OH number of 380 and a molecular weight of 443, 45 pbw of a triethylene diamine initiated polyether having an OH number of 470 and a molecular weight of 239 and containing 56.6% by weight propylene oxide and 43.3% by weight ethylene oxide, 3 pbw triethylene glycol (TEG), 6 pbw emulsifier, 3 pbw silicone surfactant available from Dow Corning under the designation L5340, 8 pbw Blowing Agent, 0.6 pbw Amine Catalyst, and 0.2 pbw Tin Catalyst by the RIM process at a mix ratio of 135 pbw of polyisocyanate to 100 pbw of polyisocyanate reactive component (Example 23). 5 pbw Flame Retardant G were added to the polyisocyanate reactive component of Example 23 and processed at 130 pbw polyisocyanate to 100 pbw polyisocyanate reactive component (Example 24). The properties of these foams at ¼" thickness were as follows:

| Example | 23 | 24 |
|---|---|---|
| Density (lb/ft$^3$) | 38.2 | 38.2 |
| Charpy (ASTM D-256-73) (ft-lb/sq in) | 6.69 | 5.40 |
| Heat Distortion Temp (°C. @ 66 psi load) | 63.2 | 70.2 |
| Flex Modulus (psi) | 163,000 | 163,000 |
| Ultimate Strength (psi) | 5,224 | 5,333 |
| UL-94 Rating | Fail | V-0 |
| Total Burn Time (Sec) | >60 | (42) |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A combustion modified isocyanate composition which is a mixture of (a) an organic polyisocyanate with (b) a brominated diphenylether.

2. The composition of claim 1 in which (b) is pentabromodiphenyl oxide.

3. The composition of claim 1 in which (b) is a mixture of tetrabromodiphenylether, pentabromodiphenylether, hexabromodiphenylether and higher brominated diphenylethers.

4. The composition of claim 1 in which (b) is a decabromodiphenyloxide.

5. The composition of claim 1 in which (a) is diphenylmethane diisocyanate.

6. The composition of claim 1 in which 10 to 20 parts by weight of component (b) are present for every 100 parts by weight of component (a).

7. A combustion modified foam produced by reacting the combustion modified isocyanate of claim 1 with a polyisocyanate reactive material, a phosphorus containing combustion modifier and a blowing agent.

8. A combustion modified foam produced by reacting the combustion modified isocyanate of claim 2 with a polyisocyanate reactive material, a phosphorus containing combustion modifier, and a blowing agent.

9. A process for the production of a combustion modified foam comprising reacting a first component (a) which is the combustion modified isocyanate of claim 1 with a second component (b) which is a component made up of an isocyanate reactive material, a phosphorus containing combustion modifier and a blowing agent by a RIM process.

* * * * *